Patented Nov. 21, 1922.

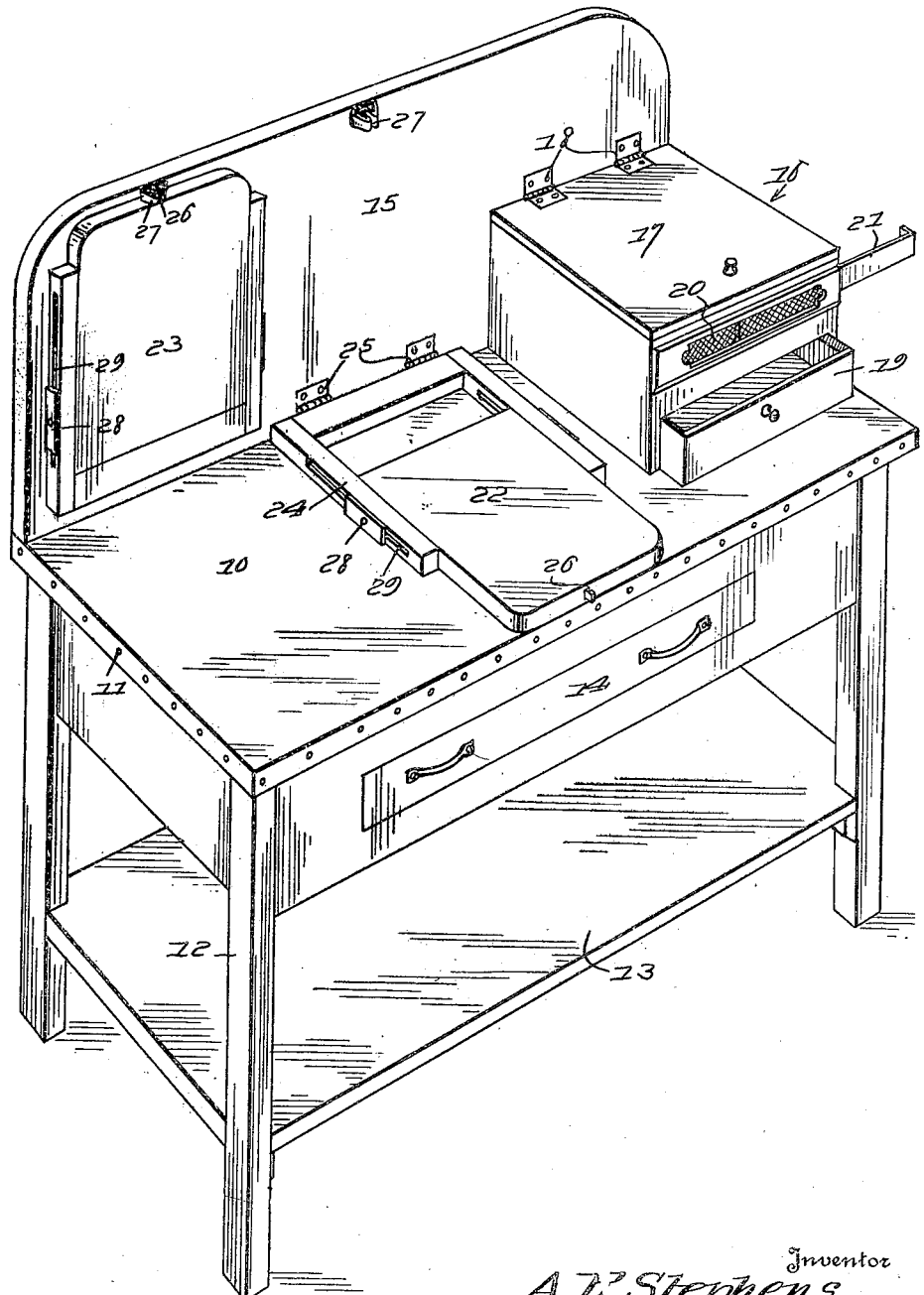

1,436,546

UNITED STATES PATENT OFFICE.

ALEXANDER R. STEPHENS, OF HIGGINSVILLE, MISSOURI.

KITCHEN TABLE.

Application filed October 11, 1921. Serial No. 507,070.

*To all whom it may concern:*

Be it known that ALEXANDER R. STEPHENS, a citizen of the United States of America, residing at Higginsville, in the county of Lafayette and State of Missouri, has invented new and useful Improvements in Kitchen Tables, of which the following is a specification.

The object of the invention is to provide a relatively simple and efficient kitchen table designed to afford the maximum area of working surface or table body for the floor space occupied under conditions adapting it to perform the various functions incident to a device designed for this purpose while affording facility in cleansing and maintaining in a proper sanitary condition; and with this object in view the invention consists in a construction and combination of parts of which a preferred embodiment is shown in the accompanying drawings, wherein:

The figure represents in perspective a table embodying the invention.

The illustrated embodiment of the invention contemplates a table top 10 preferably provided with a metallic surfacing material such as zinc which may as illustrated overlap the edges of the top and be secured by fastening means shown at 11, said top being supported by suitable legs or standards 12 between which may be arranged a shelf 13 for supporting cooking utensils, a drawer 14 being arranged in the frame below the frame of the table top and the latter being bounded at its rear edge by splash board or guard 15.

Also at one end of the table top and within convenient reach of an operator standing in front of the structure is a bread box 16 having a lid 17 hinged as at 18 and provided at its bottom with a drawer 19 to facilitate the removal of crumbs, while in the front of the box there is arranged a screened ventilating opening 20 fitted with a valve slide 21 whereby the exposure of the opening may be controlled.

Mounted for arrangement in a flat condition upon the table top and for folding in out-of-the-way relation to the table top, as for example against the front surface of the splash board or guard, are the cutting boards 22 and 23 designed respectively for bread and for meat and each consisting essentially of a wooden cutting block carried by a frame 24 which is hingedly mounted as at 25 to the splash board, the forward edge of the block being provided with a latch tongue 26 for engagement with a catch 27 when the board is in the folded position as shown at the left in Figure 1. The cutting block is preferably slidably mounted in the hinged frame as by providing the same at its side edges with T heads 28 mounted in slots 29 in the arms of the frame so that the block may be drawn forward to or beyond the edge of the table top to suit the convenience of the operator in cutting upon the surface thereof, it being obvious that the object in using the cutting boards is to protect the cutting edges of knives used in slicing bread or cutting meat or in chopping the latter or otherwise preparing it for cooking.

When the cutting boards are not in use they are adapted to be folded as shown in an out-of-the-way position with relation to the table top so as to entirely expose the latter for other purposes as for example in kneading dough or preparing vegetables for cooking, and in the folded position the rear edges of the cutting boards are raised above the surface of the table top so as to facilitate cleansing the entire surface of the table top.

Moreover when folded the operative surfaces of the cutting boards are arranged in contact with the front surface of the splash board or guard and hence are protected from the accumulation of dust and by suitably finishing or ornamenting the under surface of these cutting boards which are not exposed to the cutting action of implements used in connection with objects which are cut or sliced thereon, a neat appearance of the article of furniture may be preserved without detracting from its efficiency.

Having described the invention, what is claimed as new and useful is:—

A kitchen table having a metallic surfaced top bounded at its rear edge by an upright splash board, a U-shaped frame hingedly secured to the splash board for disposition either upright against the splash board or down upon the table top, the arms of the frame being formed with longitudinal slots, a cutting board provided on its side edges with T heads slidably engaging said slots to dispose of the board in the plane of the arms of the frame, a latch mounted on the splash board adjacent the upper edge of the latter and a latch tongue carried by the board and engageable with the latch when the frame is upright against the splash board and the cutting board lowermost in the frame.

In testimony whereof he affixes his signature.

ALEXANDER R. STEPHENS.